United States Patent [19]

Field et al.

[11] 4,343,680

[45] Aug. 10, 1982

[54] HYDROPHOBIC OLEOPHILIC WOOD PULP

[75] Inventors: Jasper H. Field, Goshen; Robert W. Hicks, Warwick, both of N.Y.

[73] Assignee: International Paper Company, New York, N.Y.

[21] Appl. No.: 241,337

[22] Filed: Mar. 6, 1981

[51] Int. Cl.³ .............................................. B01D 39/04
[52] U.S. Cl. ................................... 162/100; 210/502; 210/693; 210/924
[58] Field of Search ...................... 162/100, 158, 207; 210/924, 503, 505, 502, 693

[56] References Cited

U.S. PATENT DOCUMENTS

| | | | |
|---|---|---|---|
| 3,497,418 | 2/1970 | Thale et al. | 162/100 |
| 3,627,630 | 12/1971 | Gagnon | 162/100 |
| 3,770,575 | 11/1973 | Ball | 162/100 |
| 3,791,990 | 2/1974 | Fischer | 210/924 |
| 4,065,347 | 12/1977 | Aberg et al. | 162/26 |

FOREIGN PATENT DOCUMENTS 982951 2/1976 Canada ................................. 182/11

*Primary Examiner*—William F. Smith
*Attorney, Agent, or Firm*—Royal E. Bright; Walt Thomas Zielinski

[57] ABSTRACT

Treatment of high yield wood pulp which has ether extractives of greater than about 3.0% at temperatures of about 105° C. or higher for at least about 16 hours followed by fluffing of the heat treated pulp results in a relatively inexpensive absorbent for oil spills and the like. The oil is readily recovered from the absorbent or the oil and absorbent may be burned as fuel without separation.

11 Claims, No Drawings

HYDROPHOBIC OLEOPHILIC WOOD PULP

BACKGROUND OF THE INVENTION

Inexpensive absorbents for spills of crude and other oils from which the oil may easily be separated and recovered, or in the alternative which may be burned together with the oil as a fuel, which are readily dispersible and which float when saturated have been sought for some time.

Cellulosic pulps derived from many sources treated in various ways to enhance their oil absorbancy and reduce their tendency to absorb water and ultimately sink have been examined.

Canadian Pat. No. 982,951 describes chemically pulped, conventionally fluffed wood pulp treated with hydrophobic sizing. This patent also discusses other prior art relevant to it in this area.

The treatment of wood pulp and other cellulose pulps with various materials even such relatively inexpensive hydrophobizing material as rosin size adds extra process step costs and extra material costs to the expense of the prior art suggested absorbents.

Without these treatments it has always been considered that fluff pulp derived from wood pulp either chemically or mechanically would have too little oil absorption capacity and would absorb water too rapidly, thereby sinking, to be useful in oil spill control functions.

Methods for drying pulp by heat and producing fluffed pulp are known.

U.S. Pat. Nos. 3,497,418; 3,627,630; and 4,065,347 are illustrative thereof.

Copies of the cited United States patents and the cited Canadian patent accompany this application for the Examiner's convenience.

SUMMARY OF THE INVENTION

The invention provides in a composition aspect a fluff pulp derived from high yield wood pulp having enhanced hydrophopic and oleophilic properties by a process comprising:

(a) treating high yield wood pulp having at least 3.0% ether extractive content at temperatures greater than 100° C. for at least a sufficient time until said pulp exhibits 30% or less water absorption when tested by Tappi test T491-Su 63; and (b) fluffing the pulp produced in step a above.

The tangible embodiments of this composition aspect of the invention possess substantially enhanced hydrophobicity and oleophilicity over comparable untreated fluffed wood pulps. The levels of hydrophobicity and oleophilicity are comparable to fluffed wood pulps in the prior art which have been chemically treated to enhance these properties. The tangible embodiments, thus, exhibit the inherent applied use characteristics of being suitable solid absorbents for spills of crude and other oils on lakes, oceans, rivers and like bodies of water permitting ready removal of the spill from the water and either simple recovery of a substantial amount of said oil by conventional techniques, such as, pressing, or burning of the pulp and absorbed oil directly as fuel. Very little ash will be added by the presence of the pulp.

The invention also provides a process for the removal of oil pollutants from at least a portion of the surface of a body of water which comprises dispersing a fluff pulp as defined in the composition aspect of the invention over at least a portion of the surface of a body of water, said portion of said surface being at least partly covered by oil pollutants, and thereafter removing the pulp with absorbed oil pollutants from the surface of the body of water.

The invention also provides a process for the preparation of fluffed lignocellulosic pulp having enhanced hydrophobicity and oleophilicity which comprises:

(a) treating mechanical lignocellulosic pulp at temperatures of greater than 100° C. for at least sufficient time until said pulp exhibits 30% or less water absorption when tested by Tappi test T491-Su 63; and (b) mechanically fluffing the pulp of step a above.

DESCRIPTION OF THE PREFERRED EMBODIMENT

The manner of making and using the composition aspect and of practicing the processes of the invention will now be specifically illustrated with reference to a specific embodiment thereof, namely oleophilic, hydrophobic fluff pulp derived from unbleached thermomechanical southern pine pulp (I).

To prepare I, conventional unbleached thermomechanical southern pine pulp may be heated at temperatures of about 105° C. for about 16 hours and then cooled and converted to fluff pulp by standard methods, conveniently in a hammer (Fitz) mill. The fluff pulp (I) so produced may then be packaged in any convenient conventional form such as bags or bales. In use for absorbing oil spills from bodies of water it may be shipped to the desired area in these packages and then dispersed over the surface of the spill in conventional fashion from, for example, aircraft, ships, or small water craft. Recovery of the oil saturated I may also be by conventional means such as sieving, or filtering and it will be obvious that many suitable methods may be adopted depending on particular circumstances.

Once recovered excess oil may be pressed from the oil saturated pulp, recovered and the pulp reused or the pulp and absorbed oil may be burned as fuel either in the recovered form or after pressing into bricks, for example.

In addition to thermomechanical southern pine wood pulp it will be obvious to one of skill in the art that any mechanical pulping process which inherently does not extract a significant portion of the non-cellulose material from the wood, and producing pulp greater than 90% yield based on weight of the original wood, will be suitable for preparing the starting pulps for the practice of the invention. Illustrative of these processes are stone grinding of whole wood, refiner grinding of chips, and the like. Obviously, after pulping, if necessary, the pulp may conveniently be dewatered to low moisture content, less that 14%, in conventional fashion such as flash drying or forming into a sheet on a conventional paper machine in order to reduce the energy consumption which would otherwise be required should highly wet pulp be introduced directly into the processes of the invention.

Similarly, it will be obvious that in addition to the southern pine illustrated as a suitable wood for a source of pulp for the practice of the invention, other woods well known in the art to have an extractive content of greater than about 3.0% on an oven dry weight basis. Illustrative of these woods are most gymnosperms such as redwood, cedar, northern white pines, yellow pines, firs, and the like.

One skilled in the art will also recongnize that the exact time and temperature for heating to produce the products of the invention are not critical and that temperatures from about 100° C. to slightly below the point where perceptible charring of the wood pulp may be observed may be employed although temperatures significantly in excess of 105° C. are not expected to produce benefits commensurate with the energy cost of maintaining higher temperatures. Similarly the exact time is not especially critical as long as sufficient time is permitted for the pulp to exhibit substantially lowered water absorption. Water absorption of 30% or less in Tappi test T491-Su 63 is a good indication that a sufficient heating time for a particular pulp has been employed.

The following example further illustrates the best mode contemplated by the inventor for carrying out their invention.

EXAMPLE

Unbleached southern pine thermomechanical pulp is heated at 105° C. for 16 hours. After cooling the pulp is converted to fluff pulp in a hammer (Fitg) mill. The resulting fluffed pulp is not observed to be wetted by or sink in water up to 500 seconds, is rapidly wetted by xylene and absorbs 15 g xylene per gram of pulp from a mixture of water and xylene. The pulp containing xylene also shows no tendency to sink in water. When the fluffed pulp is added to No. 4 fuel oil floating on 0.9% saline solution, the pulp absorbs 11 g of oil per gram of pulp but little, if any water. Again, the oil saturated fluffed pulp shows no tendency to sink.

The subject matter which applicants regard as their invention is particularly pointed out and distinctly claimed as follows:

1. Hydrophobic, oleophilic pulp derived from high yield wood pulp by a process consisting essentially of:
   (a) treating high yield wood pulp having at least 3.0% ether extractive content at temperatures of greater than 100° C. for at least sufficient time until said pulp exhibits 30% or less water absorption when tested by Tappi test T491-Su 63; and
   (b) mechanically fluffing the pulp of step a above.

2. Pulp as defined in claim 1 wherein the wood pulp is derived from southern pine.

3. Pulp as defined in claims 1 or 2 wherein the wood pulp is thermomechanical pulp.

4. Pulp as defined in claims 1 or 2 wherein the wood pulp is heated at about 105° C.

5. Pulp as defined in claim 3 wherein the wood pulp is heated at about 105° C.

6. Pulp as defined in claim 1 or 2 wherein the wood pulp is heated for about 16 hours.

7. Pulp as defined in claim 3 wherein the wood pulp is heated for about 16 hours.

8. Pulp as defined in claim 4 wherein the wood pulp is heated about 16 hours.

9. Pulp as defined in claim 5 wherein the wood pulp is heated for about 16 hours.

10. A process for the preparation of hydrophobic, oleophilic wood pulp derived from high yield wood pulp which consists essentially of:
    (a) treating high yield wood pulp having at least 3.0% ether extractive content at temperatures of greater than 100° C. for at least sufficient time until said pulp exhibits 30% or less water absorption by Tappi Test T491-Su 673; and
    (b) mechanically fluffing the pulp of step a above.

11. A process for the removal of oil pollutants from at least a portion of the surface of a body of water which comprises dispersing a fluff pulp as described in claim 1 over at least a portion of the surface of a body of water, said portion of said surface being at least partly covered by oil pollutants, and thereafter removing the pulp with absorbed oil pollutants from the surface of the body of water.

* * * * *